(12) United States Patent
Ponert

(10) Patent No.: US 6,431,455 B1
(45) Date of Patent: Aug. 13, 2002

(54) CONTACTLESS DATA CARRIER

(75) Inventor: Gregor Ponert, Salzburg (AT)

(73) Assignee: SkiData AG, Gartenau (AT)

( * ) Notice: Subject to any disclaimer, the term of this patent is extended or adjusted under 35 U.S.C. 154(b) by 0 days.

(21) Appl. No.: 09/647,482

(22) PCT Filed: Jun. 14, 1999

(86) PCT No.: PCT/EP99/04084

§ 371 (c)(1),
(2), (4) Date: Sep. 27, 2000

(87) PCT Pub. No.: WO00/05686

PCT Pub. Date: Feb. 3, 2000

(30) Foreign Application Priority Data

Jul. 21, 1998 (DE) .......................... 198 32 671

(51) Int. Cl.7 .............................................. G06K 19/00
(52) U.S. Cl. ...................... 235/492; 235/375; 235/383; 235/462.44; 438/77; 438/344; 438/660
(58) Field of Search ................... 235/375, 492, 235/383, 462.44; 439/77, 344, 660

(56) References Cited

U.S. PATENT DOCUMENTS

| | | |
|---|---|---|
| 3,806,874 A | 4/1974 | Ehrat |
| 4,615,185 A | 10/1986 | Bollinger |
| 4,736,196 A | 4/1988 | McMahon et al. |
| 5,473,145 A * | 12/1995 | Wallerstorfer et al. ...... 235/382 |
| 5,504,474 A | 4/1996 | Libman et al. |
| 5,844,244 A * | 12/1998 | Graf et al. .................. 235/375 |

FOREIGN PATENT DOCUMENTS

| | | |
|---|---|---|
| DE | 84 28 610 | 1/1985 |
| EP | 0 295 985 | 12/1992 |
| FR | 002625824 A1 * | 1/1988 |
| FR | 2 669 758 | 5/1992 |
| JP | 405263555 A * | 10/1993 |
| WO | WO 88 09541 | 12/1988 |

* cited by examiner

Primary Examiner—Michael G. Lee
Assistant Examiner—Seung Ho Lee
(74) Attorney, Agent, or Firm—Flynn, Thiel, Boutell & Tanis, P.C.

(57) ABSTRACT

A data carrier for noncontacting control of persons with nontransferable entitlement to utilize a service is integrated into a bracelet (1) so as to be useless after the bracelet (1) is opened.

20 Claims, 2 Drawing Sheets

CONTACTLESS DATA CARRIER

FIELD OF THE INVENTION

This invention relates to a data carrier for noncontacting control of persons with nontransferable entitlement to utilize a service.

BACKGROUND OF THE INVENTION

Compared to data carriers which must be inserted into a control device, noncontacting data carriers interacting with a write-read unit in the radio wave range over a relatively large data transmission distance. Noncontacting data carriers have the advantage of being used hands-free while being fastened to the clothing in the form of a card for example or integrated into a wrist watch. They are therefore preferably used for example with the admission control devices of ski lifts and cable cars generally having a person singling device such as a turnstile which is actuated by the write-read unit or unblocked for a person when the write-read unit receives corresponding data from the data carrier.

In order to prevent nontransferable data carriers from being passed on to other persons, one can provide them with a photo of the user. However, elaborate photos economically only tend to be worthwhile for expensive data carriers with a longer period of validity, for example weekly ski passes in a winter sport area.

Data carriers for lower-value services, e.g. day ski passes, are thus still improperly passed on to other persons. This results in considerable damage for lift and cable car operators.

DE 84 28 610 U1 discloses a bracelet for persons under supervision, such as patients in mental institutions, which can only be opened with a special tool. That is, the data carrier is not destroyed when the bracelet is removed. The bracelet has an integrated magnetic stripe which triggers a signal when the patient passes an electronic barrier at the exit of the institution.

WO 88/09541 A discloses a bracelet with a memory chip and an antenna connected therewith to be used for example for persons who have been sentenced to house arrest. Connected to the memory chip is a photodetector which is driven by a light source via an optical fiber in the bracelet. When the bracelet is opened by pulling one end out of the housing, the light supply to the photodetector is interrupted and the chip thereby deprogrammed.

SUMMARY OF THE INVENTION

An object of the invention is to provide a relatively simply constructed noncontacting data carrier with nontransferable personal entitlement, for example for a short duration, for utilizing one or more services, e.g. the passenger transportation facilities of a ski area, which cannot be improperly passed on to other persons.

The above advantage is obtained according to the invention by integrating the noncontacting data carrier into a bracelet such that said data carrier is permanently useless, i.e. destroyed, when the bracelet is opened. The data carrier, which interacts with the write-read unit of the admission control device in the RF range ($10^4$–$3.10^9$ Hz), becomes inoperative so that the person singling device remains unactuated or blocked. This reliably prevents the nontransferable data carrier from being improperly passed on to other persons.

The data carrier can be rendered useless in different ways. For example, the antenna and/or the microchip can be rendered useless, or the circuit board if there is one connecting the antenna with the microchip. The microchip must be rendered useless in particular if a microchip with an integrated antenna is used.

The antenna must be adjusted exactly to a certain operating frequency. Accordingly, the antenna geometry must not vary. According to the invention, the antenna is therefore preferably disposed in a rigid part of the bracelet, in particular in a part of the bracelet closure.

For the same reasons, the antenna is connected with the chip by a line as short as possible, for example via a circuit board.

BRIEF DESCRIPTION OF THE DRAWINGS

The invention will be explained in more detail below by way of example with reference to the drawing, in which.

DETAILED DESCRIPTION

Figure 1:
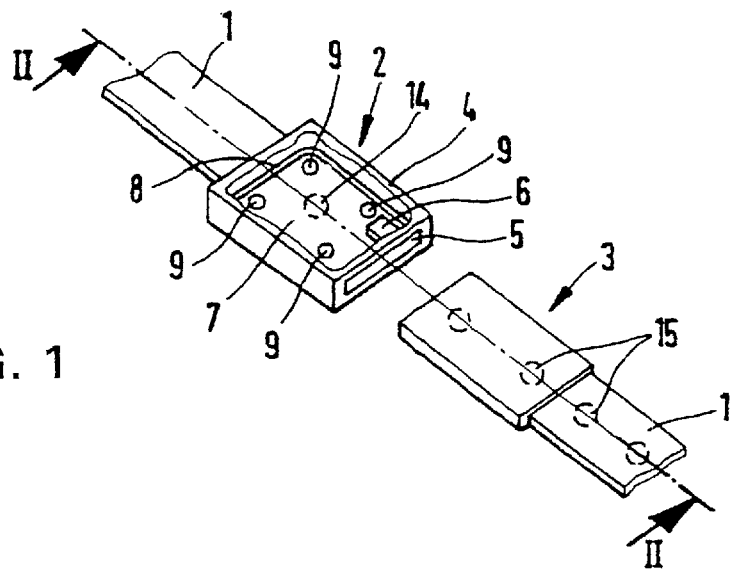
FIG. 1 shows a perspective view of the two parts of the closure of a bracelet with a broken-away upper side of a closing part according to a first embodiment.
Figure 2:
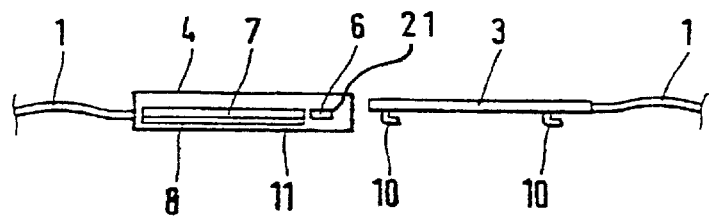
FIG. 2 shows a section along line II—II in FIG. 1.

According to FIGS. 1 and 2, a partly shown bracelet 1 has two closing parts 2, 3. One part 2 of the closure is formed by flat housing 4, and other part 3 by a tongue.

While bracelet 1 extends away from one end of housing 4, the housing has at its other end slot 5 into which tongue 3 is inserted when bracelet 1 is closed.

Housing 4 has a cavity 11 for receiving inserted tongue 3, and a microchip 6 bonded to circuit board 7 to which antenna coil 8 is connected at the same time. Chip 6 is disposed in recess 21 of circuit board 7. Antenna coil 8 can extend along the periphery of circuit board 7. Collectively, microchip 6 and antenna coil 8 are constructed to broadcast signals.

Circuit board 7 has depressions 9 which are engaged by barblike projections 10 formed on tongue 3 when tongue 3 has been inserted into housing 4. Instead, projections can be provided on circuit board 7 and depressions in tongue 3, or depressions in circuit board 7 and tongue 3 which are engaged by accordingly disposed projections in a direction opposite the inserting direction of tongue 3.

When tongue 3 is pulled out of housing 4 to open bracelet 1, this physically damages the circuit board 7, the antenna 8 and/or the chip 6, to render the data carrier permanently inoperative. In other words, microchip 6 and antenna 8 are no longer able to broadcast signals.

Figure 3:
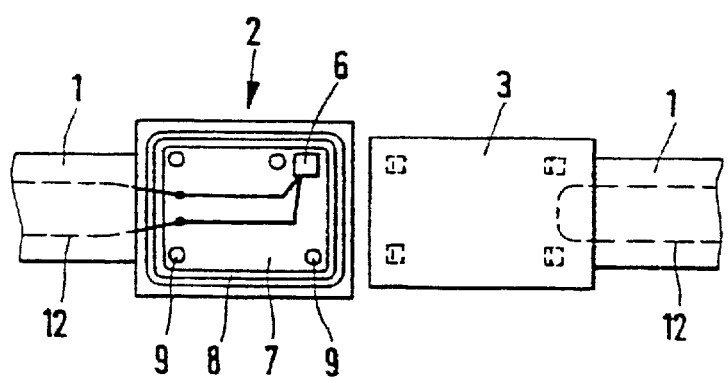
FIG. 3 shows a plan view of the two parts of a closure of a bracelet according to another embodiment, likewise with a broken-away upper side of one closing part.

The embodiment according to FIG. 3 differs from that according to FIGS. 1 and 2 substantially only in that a conductor loop 12 (shown by dashed lines) is integrated into bracelet 1 and extends along the bracelet 1 from one part 2 to the other part of the closure, being connected to chip 6 via circuit board 7.

Conductor loop 12 is connected e.g. via an output of chip 6 with the processor thereof. When conductor loop 12 is severed, chip 6 and thus the data carrier become inoperative.

In the embodiment according to FIG. 3, the data carrier is thus also protected from bracelet 1 being improperly severed outside closure 2, 3 and passed on to another person, and bracelet 1 possibly joined together at the severed place, e.g. with adhesive tape.

In order to fit bracelet 1 to the circumference of the particular person's wrist so that it cannot be slipped off the hand, it can further have a bracelet circumference fitting device which cannot be opened or only by force, for example an expansion mandrel, a rivet or in the manner of a cable tie.

Preferably, said bracelet circumference fitting device is designed so as to be opened only by rendering the data carrier permanently useless, i.e. destroying it.

Figure 5:
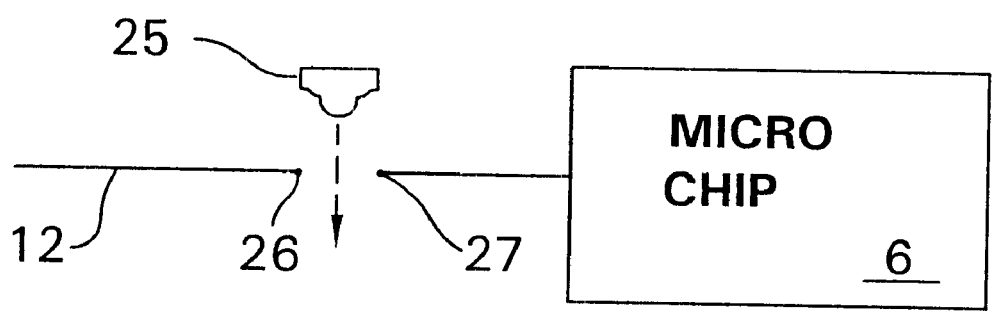
FIG. 5 is a diagramatic and schematic depiction of how a backup feature of the data carrier of this invention.

For example, housing 4 and circuit board 7 can be provided with bore 14, and tongue 3 and/or the corresponding end of bracelet 1 with openings 15 disposed one behind the other, as shown by dashed lines in FIG. 1. By inserting tongue 3 or the end of bracelet 1 through slot 5 and optionally inserting it through a corresponding slot at the other end of the housing one makes opening 15, which corresponds to the particular wrist circumference, congruent with bore 14 in board 7 or housing 4, and by introducing a rivet 25 (FIG. 5) one undetachably connects housing 4 and board 7 with tongue 3 or the end of bracelet 1.

The rivet 25 can be designed to be electroconductive, thereby closing a contact 26 (FIG. 5) necessary for the functioning of the data carrier, for example forming an interruption of antenna 8 or for example a contact between conductor loop 12 and an output 27 of chip 6, as explained in connection with FIG. 3.

Instead one can e.g. use a rivet comprising two undetachably interconnectable parts which are inserted into housing 4 from one and the other side, thereby mutually locking undetachably. Also, it is possible for example to provide housing 4 with a corresponding bore only on one side into which a button is introduced to lock undetachably with receiving means connected with board 7.

Figure 4:
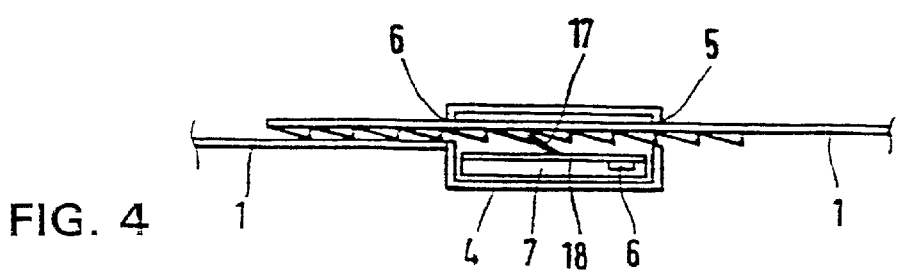
FIG. 4 shows a section through yet another embodiment of the closure.

According to the variant of the bracelet circumference fitting device shown in FIG. 4, one end of bracelet 1 is provided like a cable tie with sawtooth profile 16 which cooperates with at least one projection locking into sawtooth profile 16, for example expansion mandrel 17. Mandrel 17 is disposed on the side of circuit board 7 facing sawtooth profile 16 and spring-loaded toward sawtooth profile 16. Expansion mandrel 17 can be provided for example on board 18 which is connected e.g. by shape mating with circuit board 7. Instead of with circuit board 7, mandrel 17 or other projection can be connected with antenna 8, chip 6 and/or conductive path 12. Should tongue 3 be pulled out of housing 4, extension mandrel 17 is pivoted so as to cause the mandrel to damage the antenna 8, chip 6 and/or conductive path 12.

In order to render the data carrier permanently useless upon forcible opening of the bracelet, the bracelet can also have for example a rated breaking point in the area of conductive path 12.

Bracelet 1 with the inventive data carrier can thus be opened and removed by the person wearing bracelet 1, for example a skier, himself. However, upon removal of bracelet 1 the inventive data carrier becomes permanently useless.

What is claimed is:

1. A non-contacting data carrier comprising
a circuit board;
a microchip and an antenna mounted to said circuit board, wherein said antenna is connected to said microchip and said microchip and said antenna are collectively configured to broadcast signals;
a bracelet, said bracelet having opposed first and second ends, the first end of said bracelet being fixedly connected to said circuit board and wherein said bracelet is dimensioned so that the second end of said bracelet can at least partially overlap said circuit board; and
a connecting member extending between said circuit board and a portion of the second end of said bracelet that overlaps said circuit board, said connecting member being connected to at least one of said circuit board or said bracelet so that movement of the second end of said bracelet away from said circuit board results in movement of said connecting member against said circuit board, said microchip or said antenna that physically damages said circuit board, said microchip or said antenna so that said microchip and said antenna are not able to broadcast signals.

2. The non-contacting data carrier of claim 1, wherein: said connecting member comprises at least one projection that is attached to the second end of said bracelet; said circuit board is formed with a at least one depression in which said one projection is seated when the second end of said bracelet is fitted over said circuit board and said at least one projection is attached to said bracelet and is positioned so that, when the second end of said bracelet is moved away from said circuit board, said projection physically damages said circuit board, said microchip or said antenna.

3. The non-contacting data carrier of claim 1, wherein: said connecting member comprises at least one projection that is connected to said circuit board and directed towards the second end of said bracelet; the second end of said bracelet is formed with at least one depression in which said at least one projection is seated when the second end of said bracelet is fitted over said circuit board; and said at least one projection is attached to said circuit board and is seated in the bracelet depression so that, upon movement of the second end of said bracelet away from said circuit board, said at least one projection is displaced so as to cause physical damage to said circuit board, said microchip or said antenna.

4. The non-contacting data carrier of claim 1, wherein: a housing is provided, and said circuit board, said microchip and said antenna are disposed in said housing, the first end of said bracelet extends from said housing, and said housing is formed with an opening in which the second end of said bracelet is inserted.

5. The non-contacting data carrier of claim 4, wherein:
one of said circuit board or the second end of said bracelet is provided with a projection that functions as said connecting member;
the other of said end of said bracelet or said circuit board defines a depression in which said projection seats when the second end of said bracelet is inserted in said housing; and
said projection is attached to said circuit board or said bracelet and is seated in the depression so that, movement of the second end of said bracelet out of said housing results in movement of said projection that causes physical damage to said circuit board, said microchip or said antenna.

6. The non-contacting data carrier of claim 1, further including an irremovable fastening member attached to the second end of said bracelet for holding the second end of said bracelet over said circuit board.

7. The non-contacting data carrier of claim 6, further including a contact connected to said microchip wherein said contact is positioned so that said irremovable fastening member abuts said contact and closes a circuit formed by said contact and said microchip and said antenna are collectively configured to not broadcast signals upon the opening of said circuit formed by said contact and said microchip.

8. The non-contacting data carrier of claim 1, further included a conductor disposed in said bracelet and electrically connected to said microchip wherein said microchip and said conductor are collectively configured so that the separation of said conductor renders said microchip inoperative.

9. The non-contacting data carrier of claim 1, wherein:

the second end of said bracelet is provided with a plurality of spaced apart teeth that are directed towards said circuit board: and said connecting member is a mandrel having opposed first and second ends and the first end of said mandrel is disposed against said circuit board, said microchip or said antenna, the second end of said mandrel is disposed between two said teeth of said bracelet and said mandrel is dimensioned so that the movement of the second end of said bracelet results in movement of said mandrel against at least one of said circuit board, said microchip or said antenna so that said mandrel damages of said circuit board, said microchip or said antenna.

10. A non-contact data carrier comprising:

a housing having first and second opposed ends wherein an opening is formed in the second end of said housing;

a microchip and an antenna disposed in said housing, wherein said microchip and said antenna are connected together and are collectively configured to transmit a signal;

a bracelet, said bracelet having first and second opposed ends, the first end of said bracelet being fixedly secured to the first end of said housing and said bracelet being dimensioned so that the second end of said bracelet can be inserted in the opening formed in said housing; and a connecting member disposed in said housing and that is located adjacent at least one of said microchip or said antenna, wherein said connecting member extends from or is connected to the second end of said bracelet so that, upon withdrawal of said bracelet from the housing opening, said connecting member physically abuts said microchip or said antenna so as to damage said microchip or said antenna so that said microchip and said antenna are not able to broadcast signals.

11. The non-contacting data carrier of claim 10, wherein:

said antenna is connected to a circuit board disposed in said housing; and said connecting member is positioned against or extends from said circuit board so that withdrawal of said bracelet from the housing opening results in said connecting member damaging at least one of said circuit board, said microchip or said antenna.

12. The non-contacting data carrier of claim 11, wherein:

said circuit board or the second end of said bracelet is provided with a projection that functions as said connecting member;

the other of said end of said bracelet or said circuit board defines a depression in which said projection seats when the second end of said bracelet is inserted in said housing; and said projection is attached to said circuit board or said bracelet and is seated in the depression so that, movement of the second end of said bracelet out of said housing results in movement of said projection that causes physical damage to at least one of said circuit board, said microchip or said antenna.

13. The non-contacting data carrier of claim 11, wherein:

the second end of said bracelet is provided with a plurality of spaced apart teeth that are directed towards said circuit board: and said connecting member is a mandrel having opposed first and second ends and the first end of said mandrel is disposed against said circuit board, said microchip or said antenna, the second end of said mandrel is disposed between two said teeth of said bracelet and said mandrel is dimensioned so that the movement of the second end of said bracelet results in movement of said mandrel against said circuit board, said microchip or said antenna so that said mandrel damages said circuit board, said microchip or said mandrel.

14. The non-contacting data carrier of claim 10, wherein:

said antenna is mounted to a substrate disposed in said housing; and said connecting member comprises at least one projection that is attached to the second end of said bracelet wherein said projection is configured to engage said substrate upon insertion of the second end of said bracelet in said housing and is positioned to move against said substrate upon withdrawal of said bracelet against said housing so that said movement of said projection against said substrate results in damage to said microchip or said antenna.

15. The non-contacting data carrier of claim 10, further including a irremovable fastening member attached to the second end of said bracelet for holding the second end of said bracelet to said housing.

16. The non-contacting data carrier of claim 15, further including a contact connected to said microchip wherein said contact is positioned so that said irremovable fastening member abuts said contact and closes a circuit formed by said contact and said microchip and said antenna are collectively configured to not broadcast signals upon the opening of said circuit formed by said contact.

17. The non-contacting data carrier of claim 10, further included a conductor disposed in said bracelet and electrically connected to said microchip wherein said microchip and said conductor are collectively configured so that the separation of said conductor renders said microchip inoperative.

18. The non-contacting data carrier of claim 10, wherein:

the second end of said bracelet is provided with a plurality of spaced apart teeth that are directed towards said microchip or said antenna; and said connecting member is a mandrel having opposed first and second ends and the first end of said mandrel is disposed in said housing adjacent at least one of said microchip or said antenna, the second end of said mandrel is disposed between two said teeth of said bracelet and said mandrel is dimensioned so that the movement of the second end of said bracelet results in movement of said mandrel against said microchip or said antenna so that said mandrel damages of said microchip or said antenna.

19. A non-contacting data carrier comprising:

a bracelet having a first end formed with a closure and a second end opposite the closure, wherein the bracelet is dimensioned so that the second end can seat in said closure and said closure is shaped to hold the second end;

a microchip disposed in said closure;

an antenna disposed in said closure, wherein said microchip and said antenna are connected together and are configured to broadcast signals;

a projecting member extending from one of said closure or the second end of said bracelet that has a free end wherein said projecting member is positioned so that, upon seating of the second end of said bracelet in said closure, the free end of said projection engages a portion of said bracelet or said closure and said projecting member is connected to said closure or said bracelet so that, upon removal of the second end of said bracelet from said closure, said projecting member moves against said antenna or said microchip to physically damage said antenna or said microchip.

20. A non-contacting data carrier comprising:

a bracelet having a first end formed with a closure and a second ends opposite the closure, wherein: the bracelet is dimensioned so that the second end can seat in said closure; said closure is shaped to hold said second end; and the second end is shaped to have a plurality of spaced-apart teeth;

a microchip disposed in said closure;

an antenna disposed in said closure, wherein said microchip and said antenna are connected together and are configured to broadcast signals;

a mandrel is disposed in said closure, wherein: said mandrel has first and second opposed ends; the first end of said mandrel is seated against a surface in said closure; the second end of said mandrel is positioned between two said teeth of said bracelet; said mandrel is positioned against at least one of said microchip or said antenna; and said mandrel is dimensioned so that movement of the second end of said bracelet away from said closure results in movement of said mandrel against said microchip or said antenna so that said mandrel physically damages said microchip or said antenna.

* * * * *